United States Patent
Lim et al.

(10) Patent No.: US 9,432,891 B2
(45) Date of Patent: Aug. 30, 2016

(54) METHOD AND APPARATUS FOR SELECTING EQUIVALENT PLMN

(71) Applicant: Samsung Electronics Co., Ltd., Gyeonggi-do (KR)

(72) Inventors: Han Na Lim, Seoul (KR); Song Yean Cho, Seoul (KR); Sang Soo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/377,112

(22) PCT Filed: Feb. 5, 2013

(86) PCT No.: PCT/KR2013/000924
§ 371 (c)(1),
(2) Date: Aug. 6, 2014

(87) PCT Pub. No.: WO2013/119025
PCT Pub. Date: Aug. 15, 2013

(65) Prior Publication Data
US 2015/0045025 A1 Feb. 12, 2015

Related U.S. Application Data

(60) Provisional application No. 61/595,646, filed on Feb. 6, 2012.

(51) Int. Cl.
*H04W 36/00* (2009.01)
*H04W 36/20* (2009.01)
(Continued)

(52) U.S. Cl.
CPC ..... *H04W 36/0083* (2013.01); *H04W 36/0016* (2013.01); *H04W 36/0066* (2013.01);
(Continued)

(58) Field of Classification Search
CPC ..... H04W 88/06; H04W 88/18; H04W 8/08; H04W 36/0016; H04W 36/0083; H04W 36/14; H04W 36/20; H04W 48/16; H04W 72/0413; H04W 72/048; H04W 76/046; H04W 84/042; H04W 88/10; H04W 48/18; H04W 36/0033; H04W 36/08; H04W 40/34
See application file for complete search history.

(56) References Cited

U.S. PATENT DOCUMENTS

2007/0255797 A1 11/2007 Dunn et al.
2009/0270099 A1* 10/2009 Gallagher ............... H04W 8/08
455/435.1

(Continued)

FOREIGN PATENT DOCUMENTS

| JP | 102011511481 | 4/2011 |
| KR | 1020110037484 | 4/2011 |
| WO | WO-2009096496 | 8/2009 |

OTHER PUBLICATIONS

PCT/ISA/237 Written Opinion issued on PCT/KR2013/000924 (pp. 5).

(Continued)

*Primary Examiner* — Hirdepal Singh
(74) *Attorney, Agent, or Firm* — The Farrell Law Firm, P.C.

(57) ABSTRACT

Provided are a method and apparatus for selecting a Public Land Mobile Network (PLMN). A method for providing a PLMN list in a Mobility Management Entity (MME) may include: receiving a request from a user equipment (UE); determining whether the UE prefers Voice over Long Term Evolution (VoLTE) according to the request; and sending, when the UE prefers VoLTE, a variant equivalent PLMN list that contains, for each PLMN, information indicating whether VoLTE is supported by the PLMN or a VoLTE-support PLMN list that contains only PLMNs supporting VoLTE. Hence, the UE having a preference for VoLTE may select an equivalent PLMN supporting VoLTE in an effective manner.

8 Claims, 10 Drawing Sheets

(51) Int. Cl.
    *H04W 36/14*     (2009.01)
    *H04W 48/16*     (2009.01)
    *H04W 84/04*     (2009.01)
    *H04W 72/04*     (2009.01)
    *H04W 76/04*     (2009.01)
    *H04W 36/38*     (2009.01)
    *H04W 88/06*     (2009.01)
    *H04W 88/10*     (2009.01)

(52) U.S. Cl.
    CPC .............. *H04W36/14* (2013.01); *H04W 36/20* (2013.01); *H04W 36/38* (2013.01); *H04W 48/16* (2013.01); *H04W 72/048* (2013.01); *H04W 72/0413* (2013.01); *H04W 76/046* (2013.01); *H04W 84/042* (2013.01); *H04W 88/06* (2013.01); *H04W 88/10* (2013.01)

(56) References Cited

U.S. PATENT DOCUMENTS

| | | | |
|---|---|---|---|
| 2010/0195643 A1* | 8/2010 | Kodali | H04W 48/18 370/352 |
| 2010/0261474 A1* | 10/2010 | Gollapudi | H04W 48/18 455/435.3 |
| 2011/0080849 A1 | 4/2011 | Choi | |
| 2011/0158165 A1* | 6/2011 | Dwyer | H04W 60/00 370/328 |
| 2011/0249624 A1* | 10/2011 | Ramachandran | H04W 48/18 370/328 |
| 2012/0213152 A1* | 8/2012 | Hegarty | H04L 65/80 370/328 |
| 2012/0320817 A1* | 12/2012 | Xu | H04W 8/08 370/315 |
| 2013/0090082 A1* | 4/2013 | Lim | H04W 4/22 455/404.1 |
| 2013/0143542 A1* | 6/2013 | Kovvali | H04W 48/18 455/418 |
| 2013/0188484 A1* | 7/2013 | Aksu et al. | 370/235 |
| 2013/0195009 A1* | 8/2013 | Ramle | H04W 36/0022 370/328 |
| 2014/0010185 A1* | 1/2014 | Morita | H04W 48/16 370/329 |
| 2014/0204901 A1* | 7/2014 | Hedman | H04W 36/0022 370/331 |
| 2014/0370842 A1* | 12/2014 | Abtin | H04L 65/1069 455/404.2 |
| 2015/0049668 A1* | 2/2015 | Cho | H04W 48/18 370/328 |
| 2015/0117401 A1* | 4/2015 | Jiang | H04W 48/18 370/331 |
| 2015/0156687 A1* | 6/2015 | Wu | H04W 36/0083 455/436 |

OTHER PUBLICATIONS

PCT/ISA/210 Search Report issued on PCT/KR2013/000924 (pp. 3).

3rd Generation Partnership Project; Technical Specification Group Core Network and Terminals; Non-Access-Stratum (NAS) functions related to Mobile Station (MS) in idle mode (Release 11). 3GPP TS 23.122 V11.1.0 Dec. 2011 (pp. 44).

3rd Generation Partnership Project; Technical Specification Group Core Network and Terminals; Non-Access-Stratum (NAS) protocol for Evolved Packet System (EPS); Stage 3 (Release 11). 3GPP TS 24.301 V11.1.0 Dec. 2011 (pp. 326).

Ericsson et al., "SRVCC and Shared Networks", SA WG2 Meeting #88, S2-114940, Nov. 14-18, 2011, 4 pages.

Huawei et al., "E-PLMN List Usage for Registered CS PLMN", 3GPP TSG SA WG2 Meeting #81, TD S2-105027, Oct. 11-15, 2010, 4 pages.

European Search Report dated Oct. 30, 2015 issued in counterpart Appln. No. 13746250.3-1870, 7 pages.

\* cited by examiner

| 8 | 7 | 6 | 5 | 4 | 3 | 2 | 1 | |
|---|---|---|---|---|---|---|---|---|
| \multicolumn{8}{|c|}{PLMN List IEI} | Octet 1 |
| Length of PLMN List contents | | | | | | | | Octet 2 |
| MCC digit2, PLMN1 | | | | MCC digit1, PLMN1 | | | | Octet 3 |
| MNC digit1, PLMN1 | | | | MCC digit3, PLMN1 | | | | Octet 4 |
| MNC digit3, PLMN1 | | | | MNC digit2, PLMN1 | | | | Octet 5 |
| MCC digit2, PLMN14 | | | | MCC digit1, PLMN14 | | | | Octet 42 |
| MNC digit1, PLMN14 | | | | MCC digit3, PLMN14 | | | | Octet 43 |
| MNC digit3, PLMN14 | | | | MNC digit2, PLMN14 | | | | Octet 44 |
| VoLTE support indicator for PLMN 8 | VoLTE support indicator for PLMN 7 | VoLTE support indicator for PLMN 6 | VoLTE support indicator for PLMN 5 | VoLTE support indicator for PLMN 4 | VoLTE support indicator for PLMN 3 | VoLTE support indicator for PLMN 2 | VoLTE support indicator for PLMN 1 | Octet 45 |
| reserved | reserved | VoLTE support indicator for PLMN 14 | VoLTE support indicator for PLMN 13 | VoLTE support indicator for PLMN 12 | VoLTE support indicator for PLMN 11 | VoLTE support indicator for PLMN 10 | VoLTE support indicator for PLMN 9 | Octet 46 |
| reserved | reserved | reserved | reserved | reserved | reserved | reserved | reserved | Octet 47 |

| | 8 | 7 | 6 | 5 | 4 | 3 | 2 | 1 | |
|---|---|---|---|---|---|---|---|---|---|
| | \multicolumn{8}{l|}{PLMN List IEI} | Octet 1 |
| | \multicolumn{8}{l|}{Length of PLMN List contents} | Octet 2 |
| | MCC digit2, PLMN1 | | | | MCC digit1, PLMN1 | | | | Octet 3 |
| | MNC digit1 PLMN1 | | | | MCC digit3, PLMN1 | | | | Octet 4 |
| | MNC digit3, PLMN1 | | | | MNC digit2, PLMN1 | | | | Octet 5 |
| | | | | | | | | | |
| | MCC digit2, PLMNxx | | | | MCC digit1, PLMNxx | | | | Octet xx |
| | MNC digit1, PLMNxx | | | | MCC digit3, PLMNxx | | | | Octet xx |
| | MNC digit3, PLMNxx | | | | MNC digit2, PLMNxx | | | | Octet xx |

METHOD AND APPARATUS FOR SELECTING EQUIVALENT PLMN

TECHNICAL FIELD

The present invention relates to a wireless communication system and, more particularly, to a method and apparatus for selecting a Public Land Mobile Network (PLMN) equivalent to the registered PLMN.

BACKGROUND ART

In 3GPP systems such as GSM, WCDMA and LTE, a public land mobile network (PLMN) refers to a network operated by a communication service provider. PLMNs may be identified by PLMN identifiers (PLMN IDs). A PLMN ID is composed of the Mobile Country Code (MCC) and the Mobile Network Code (MNC). When a user equipment (UE) is turned on, the UE selects a PLMN and registers on the PLMN according to priorities in a stored PLMN list. The PLMN on which the UE is successfully registered is referred to as the registered PLMN. When a UE roams or network coverage of a network operator covers only a part (not whole) of the country, the network operator may make a roaming agreement with a different network operator so as to enable the UE to use a PLMN of the different network operator. In other words, the UE may perform inter-PLMN handover. For inter-PLMN movement, a PLMN considered as equivalent to the registered PLMN by the UE is referred to as an equivalent PLMN.

In other words, an equivalent PLMN is a PLMN that is considered as equivalent to the registered PLMN by the UE for PLMN selection, and cell selection/reselection. For example, in the LTE system, a UE may receive an equivalent PLMN list from the network or update an existing equivalent PLMN list in the course of a procedure for attach, combined attach, tracking area update (TAU), or combined TAU. The UE stores both the equivalent PLMN list and registered PLMN information. This stored list is maintained even when the UE is turned off, and may be used for PLMN selection and cell selection when the UE is turned on again. The stored list may be deleted when the Universal Subscriber Identity Module (USIM) is removed from the UE or when the UE makes an emergency call.

The attach procedure is a procedure whereby the UE connects to the network. The combined attach procedure is a procedure whereby the UE connects to both a Packet Service (PS) network and a Circuit Service (CS) network. The TAU procedure is a procedure whereby the UE notifies the network of a change in Tracking Area (TA) or occurrence of a designated event. The combined TAU procedure is a procedure whereby the UE notifies both a PS network and a CS network of a TA change.

In most cases, a UE may have to receive an equivalent PLMN list that has been created according to preset operator policies regardless of services desired by the UE. However, PLMNs in the equivalent PLMN list may fail to provide the same service. For example, only some of PLMNs in the equivalent PLMN list may provide a Voice over Internet Protocol (VoIP) service such as Voice over Long Term Evolution (VoLTE). A UE may prefer utilizing a VoIP voice call service to utilizing a CS voice call service, or may support a VoIP voice call service only. Additionally, in the same PLMN, only some evolved Node Bs (eNBs or base stations) may support a VoIP voice call service. In this case, when a UE receives an equivalent PLMN list in which only roaming agreements of network operators are reflected but UE service preferences or supportability and eNB service supportability are not reflected, the UE may fail to receive a desired service.

Figure 1:
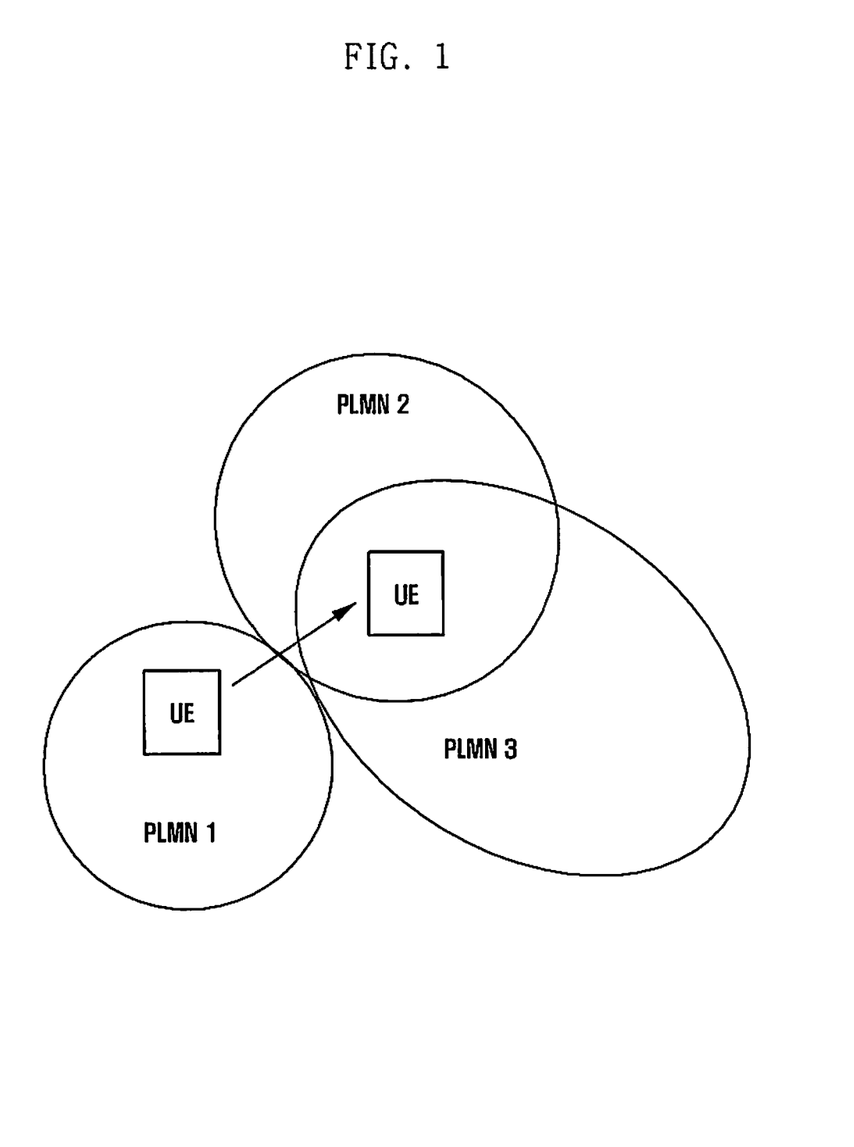
FIG. 1 depicts a situation where a UE roams from PLMN-1 to the service area of PLMN-2 and PLMN-3.

FIG. 1 depicts a situation where a UE roams from PLMN-1 to the service area of PLMN-2 and PLMN-3.

In FIG. 1, the UE supports VoLTE and prefers usage of VoLTE to a CS voice call service. Among three PLMNs (PLMN-1, PLMN-2 and PLMN-3), the registered PLMN is PLMN-1. PLMN-1 supports VoLTE; PLMN-2 does not support VoLTE; and PLMN-3 supports VoLTE. According to an existing scheme, as the Mobility Management Entity (MME) creates an equivalent PLMN list without consideration of UE preferences for VoLTE, PLMN-2 and PLMN-3 may be contained in the equivalent PLMN list of PLMN-1. In this case, as the UE may randomly selects a PLMN from the equivalent PLMN list for PLMN selection and/or cell selection, PLMN-2 not supporting VoLTE may be selected. Consequently, the UE may be unable to receive a voice service in a supportable or preferable manner.

DISCLOSURE OF INVENTION

Technical Problem

The present invention has been made in view of the above problems. Accordingly, an aspect of the present invention is to provide a method that enables a user equipment having a preference for a specific service to select a PLMN supporting the service.

More specifically, an aspect of the present invention is to provide a method that enables a user equipment supporting/preferring VoLTE to select a PLMN/cell supporting VoLTE first.

Solution to Problem

In accordance with an aspect of the present invention, a method for providing a PLMN list in an MME is provided. The method may include: receiving a request from a UE; determining whether the UE prefers VoLTE according to the request; and sending, when the UE prefers VoLTE, a variant equivalent PLMN list that contains, for each PLMN, information indicating whether VoLTE is supported by the PLMN or a VoLTE-support PLMN list that contains only PLMNs supporting VoLTE.

In accordance with an aspect of the present invention, a method for selecting an equivalent PLMN in a user equipment (UE) is provided. The method may include: receiving a variant equivalent PLMN list that contains, for each PLMN, information indicating whether VoLTE is supported by the PLMN or a VoLTE-support PLMN list that contains only PLMNs supporting VoLTE; and selecting an equivalent PLMN supporting VoLTE on the basis of the variant equivalent PLMN list or VoLTE-support PLMN list.

In accordance with an aspect of the present invention, a method for selecting an equivalent PLMN in an evolved Node B (eNB) is provided. The method may include: receiving a variant equivalent PLMN list that contains, for each PLMN, information indicating whether VoLTE is supported by the PLMN or a VoLTE-support PLMN list that contains only PLMNs supporting VoLTE; and selecting, when PLMN selection is needed for a UE having a preference for VoLTE, an equivalent PLMN supporting VoLTE on the basis of the variant equivalent PLMN list or VoLTE-support PLMN list; and sending a "handover required" message to a target eNB corresponding to the selected PLMN.

In accordance with another aspect of the present invention, a Mobility Management Entity (MME) providing PLMN lists is provided. The MME may include: a communication unit to receive a request from a UE; and a control unit to determine whether the UE prefers VoLTE on the basis of the request. When the UE prefers VoLTE, the communication unit may send a variant equivalent PLMN list that contains, for each PLMN, information indicating whether VoLTE is supported by the PLMN or a VoLTE-support PLMN list that contains only PLMNs supporting VoLTE.

In accordance with another aspect of the present invention, a user equipment (UE) selecting an equivalent PLMN is provided. The UE may include: a communication unit to receive a variant equivalent PLMN list that contains, for each PLMN, information indicating whether VoLTE is supported by the PLMN or a VoLTE-support PLMN list that contains only PLMNs supporting VoLTE; and a control unit to select an equivalent PLMN supporting VoLTE on the basis of the variant equivalent PLMN list or VoLTE-support PLMN list.

In accordance with another aspect of the present invention, an evolved Node B (eNB) selecting an equivalent PLMN is provided. The eNB may include: a communication unit to receive a variant equivalent PLMN list that contains, for each PLMN, information indicating whether VoLTE is supported by the PLMN or a VoLTE-support PLMN list that contains only PLMNs supporting VoLTE; and a control unit to select, when PLMN selection is needed for a UE having a preference for VoLTE, an equivalent PLMN supporting VoLTE on the basis of the variant equivalent PLMN list or VoLTE-support PLMN list. The communication unit may send a "handover required" message to a target eNB corresponding to the selected PLMN.

Advantageous Effects of Invention

In a feature of the present invention, a user equipment having a preference for VoLTE may select an equivalent PLMN supporting VoLTE in an effective manner.

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the present invention.

The following description of embodiments of the present invention is focused on the Evolved Packet System (EPS). However, it should be apparent to those skilled in the art that the subject matter of the present invention is also applicable to other communication systems having a similar technical background without significant modification.

In a first embodiment of the present invention, the MME creates an equivalent PLMN list in consideration of UE preference for VoLTE and eNB supportability for VoLTE.

For each PLMN in an equivalent PLMN list of the first embodiment, information indicating whether VoLTE is supported by the PLMN is included. In the following description, an equivalent PLMN list created according to the first embodiment of the present invention is referred to as an equivalent PLMN* list (asterisk added) or as a first variant PLMN list.

The MME delivers the created equivalent PLMN* list to the eNB and UE.

In a second embodiment of the present invention, the MME creates a VoLTE-support PLMN list in consideration of UE preference for VoLTE and eNB supportability for VoLTE, separately from an equivalent PLMN list. The MME delivers the created VoLTE-support PLMN list to the eNB and UE.

In a third embodiment of the present invention, for PLMN selection, a UE having a preference for VoLTE selects a PLMN supporting VoLTE from the received equivalent PLMN* list or VoLTE-support PLMN list. Selection of the PLMN may involve selection of a cell belonging to the PLMN.

In a fourth embodiment of the present invention, when a UE having a preference for VoLTE performs handover, the source eNB selects a PLMN supporting VoLTE from the received equivalent PLMN* list or VoLTE-support PLMN list. Selection of the PLMN may involve selection of a cell belonging to the PLMN as a target cell. Selection of the PLMN may involve selection of an eNB managing cells belonging to the PLMN as a target eNB.

Figure 2:
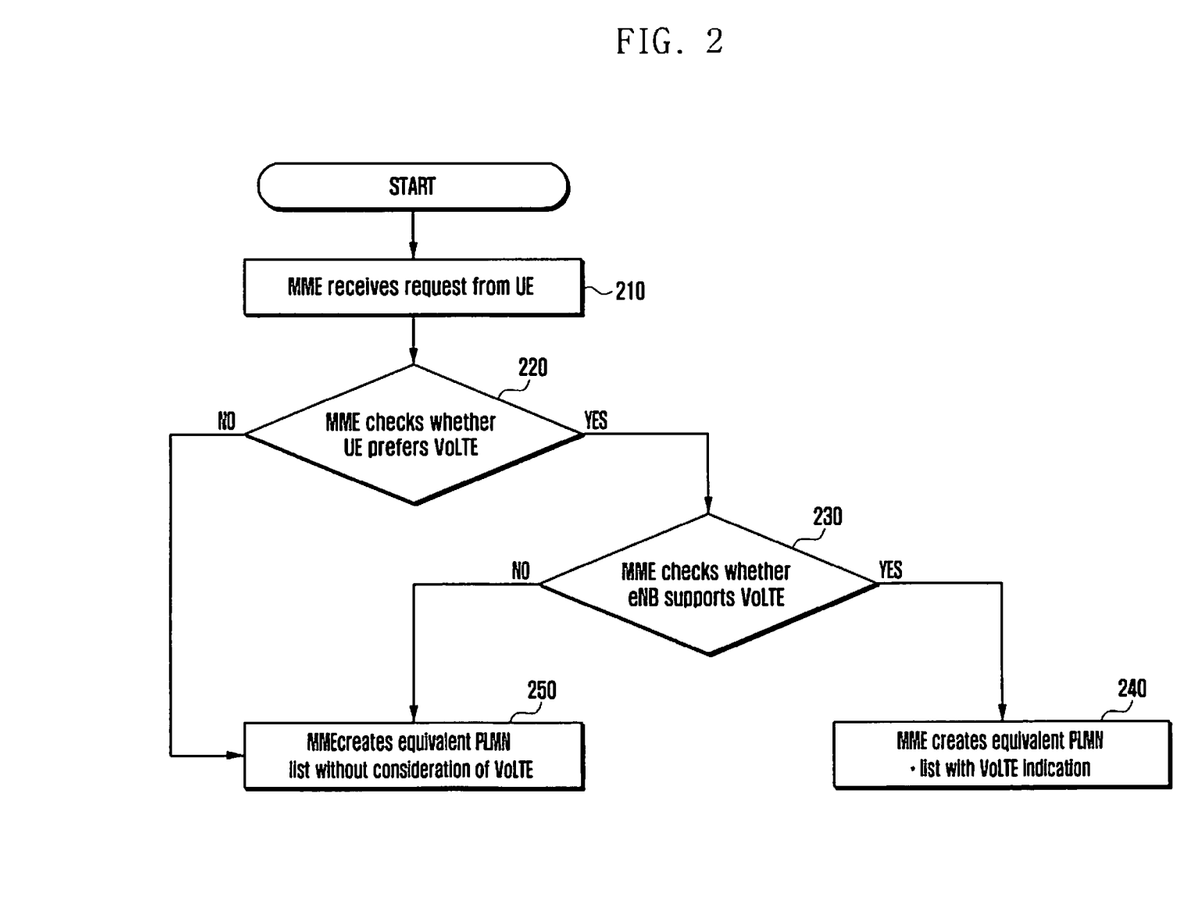
FIG. 2 is a flowchart of a procedure performed by the MME for creating an equivalent PLMN* list according to a first embodiment of the present invention.

FIG. 2 is a flowchart of a procedure performed by the MME for creating an equivalent PLMN* list according to the first embodiment of the present invention.

At step 210, the MME receives a request from a UE. Here, the request may be one or more of an attach request, a combined attach request, a TAU request, and a combined TAU request.

At step 220, the MME checks whether the UE having sent the request prefers VoLTE. For example, when the request contains information on VoLTE preference, the MME may determine that the UE prefers VoLTE. The MME may recognize UE preferences on the basis of an information element "voice domain preference and UE usage setting" sent by the UE.

Upon determining that the UE has a preference for VoLTE, the procedure proceeds to step 230 at which the MME determines whether the eNB serving the UE supports VoLTE. Determination at step 230 may be achieved through a function "UE Radio Capability Match". In a variant embodiment, step 230 may be skipped by assuming that all eNBs support VoLTE.

Upon determining that the eNB supports VoLTE, the procedure proceeds to step 240 at which the MME creates an equivalent PLMN* list with VoLTE indication.

Upon determining that the UE does not have a preference for VoLTE at step 220, or upon determining that the eNB does not support VoLTE at step 230, the procedure proceeds to step 250 at which the MME creates an equivalent PLMN list according to an existing scheme without consideration of VoLTE.

Figure 3:
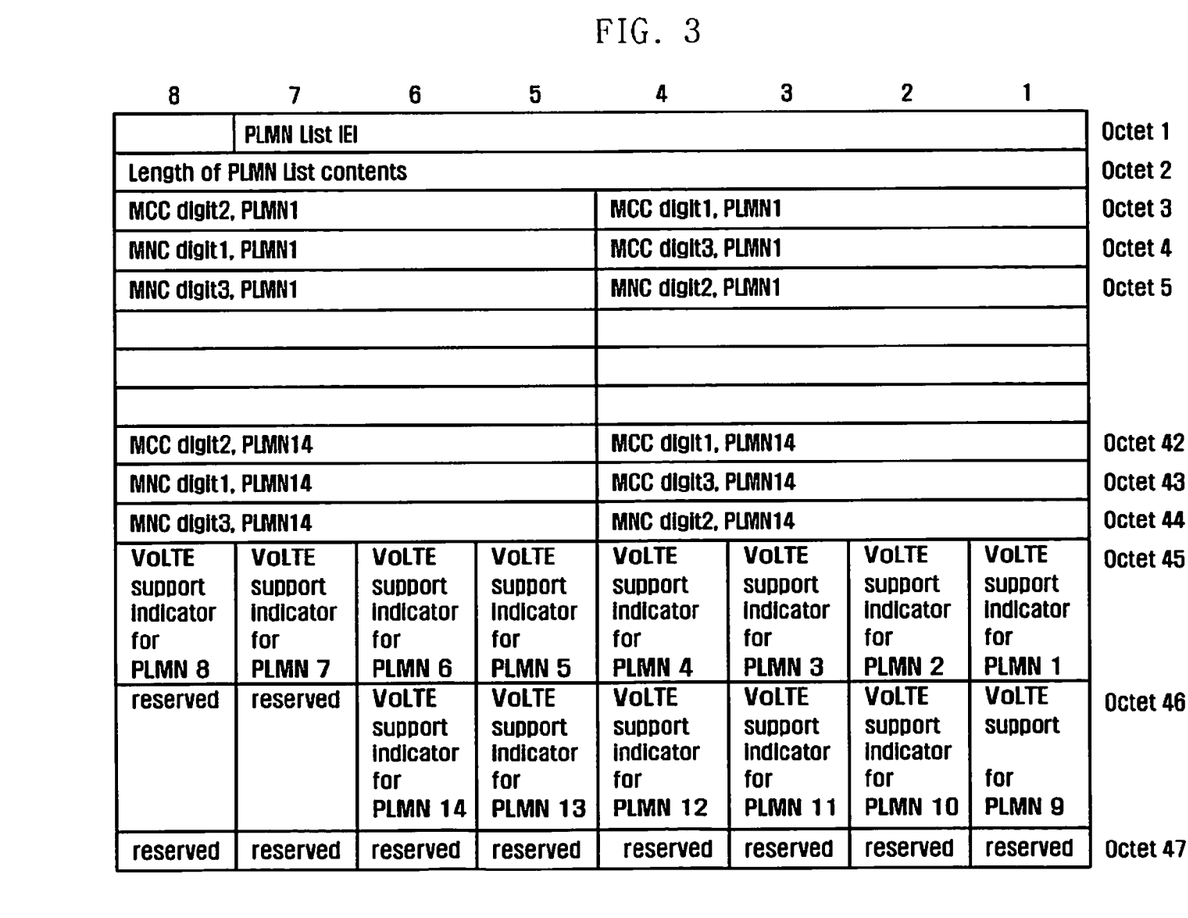
FIG. 3 illustrates an equivalent PLMN* list according to the first embodiment of the present invention.

FIG. 3 illustrates an equivalent PLMN* list according to the first embodiment of the present invention.

In the first embodiment, for each PLMN in an equivalent PLMN* list, information indicating whether VoLTE is supported by the PLMN is included in the equivalent PLMN* list. In the first embodiment, this indication may be achieved using an indicator or field "VoLTE support indicator for PLMN". When a PLMN supports VoLTE, the corresponding indicator may be set to 1; and when a PLMN does not support VoLTE, the corresponding indicator may be set to 0. The VoLTE support indicator for a PLMN may be combined with other information or be two or more bits wide. On the contrary, when a PLMN supports VoLTE, the corresponding VoLTE support indicator may be set to 0; and when a PLMN does not support VoLTE, the corresponding VoLTE support indicator may be set to 1.

Figure 4:
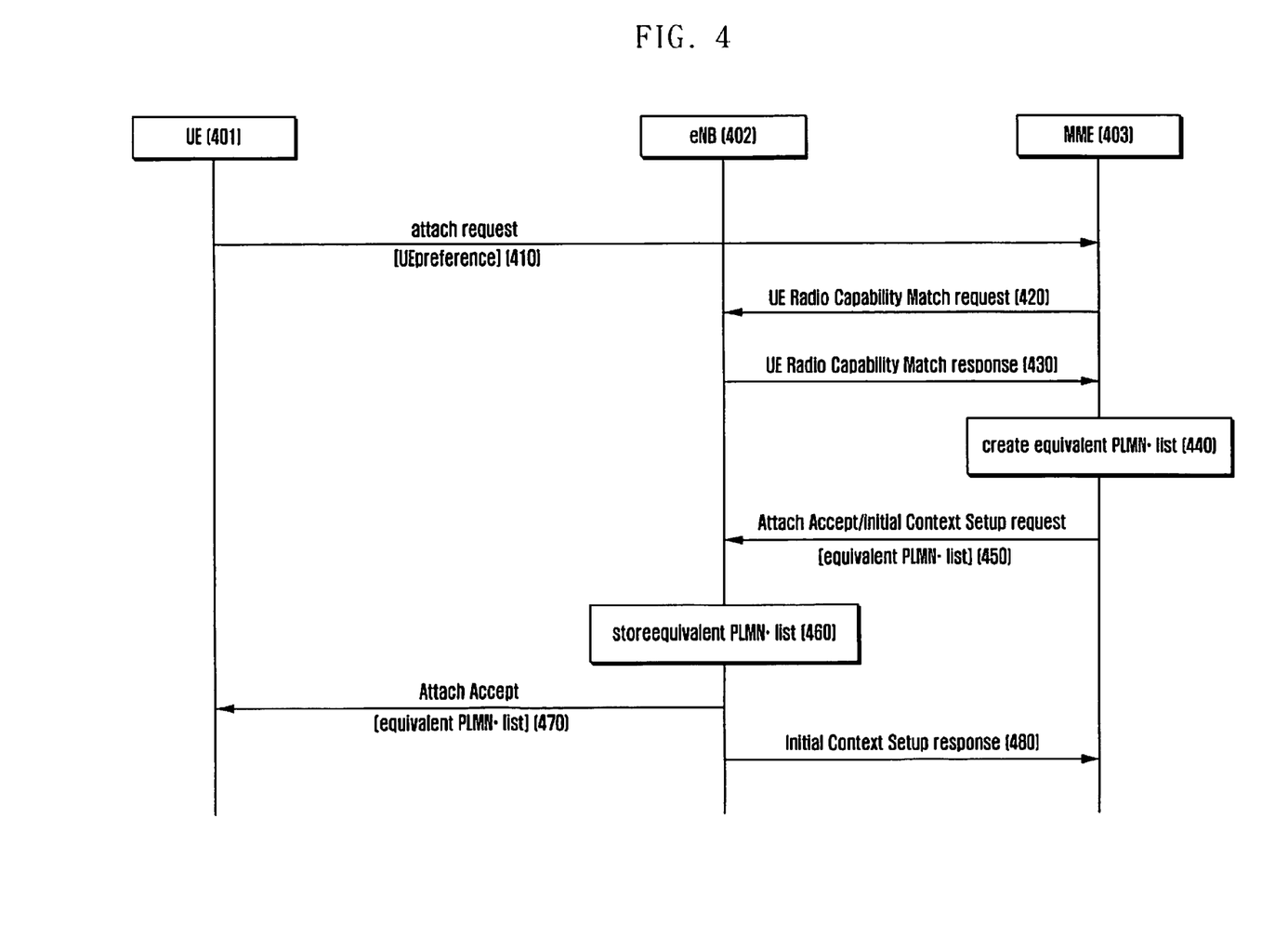
FIG. 4 is a sequence diagram illustrating delivery of a PLMN* list according to the first embodiment of the present invention.

FIG. 4 is a sequence diagram illustrating delivery of a PLMN* list according to the first embodiment of the present invention. In FIG. 4, a PLMN* list is delivered as part of the attach procedure. In a variant embodiment, a PLMN* list may be delivered as part of a different procedure or as a separate procedure. Steps of the attach procedure not directly related to the preset embodiment are omitted in FIG. 4.

At step 410, a UE 401 sends an attach request to an MME 403 of the network. Here, the attach request may include an indicator for VoLTE preference of the UE 401. VoLTE preference may be indicated by the existing information element "voice domain preference and UE's usage setting". Alternatively, a new parameter indicating VoLTE preference may be added.

At step 420, the MME 403 sends a UE Radio Capability Match request to the eNB 402 serving the UE 401. At step 430, the MME 403 receives a UE Radio Capability Match response from the eNB 402. Step 420 and step 430 are related to the UE Radio Capability Match function. The MME 403 may determine whether the eNB 402 supports VoLTE by use of the UE Radio Capability Match function. Among PLMNs belonging to the same PLMN, some eNBs may support VoLTE and some other eNBs may not support VoLTE. Hence, it is necessary to examine radio capabilities for each eNB. The MME 403 may use the UE Radio Capability Match function to identify radio capabilities of the eNB 402.

At step 440, the MME 403 creates an equivalent PLMN* list or equivalent PLMN list in consideration of preferences of the UE 401 and VoLTE supportability of the eNB 402. The list to be created may be determined according to the procedure of FIG. 2. Here, it is assumed that the MME 403 creates an equivalent PLMN* list.

At step 450, the MME 403 sends an Attach Accept/Initial Context Setup request to the eNB 402. Here, the Attach Accept/Initial Context Setup request contains the equivalent PLMN* list. The Initial Context Setup request/response is used by the MME 403 to send UE context to the eNB 402.

At step 460, the eNB 402 stores the received equivalent PLMN* list (having information on VoLTE supportability).

At step 470, the eNB 402 forwards the Attach Accept message to the UE 401. Here, the Attach Accept message contains the equivalent PLMN* list.

At step 480, the eNB 402 sends an Initial Context Setup response to the MME 403.

In a variant embodiment, the UE 401 may receive a PLMN* list as part of the TAU procedure instead of the attach procedure. When an updated equivalent PLMN* list is delivered through the TAU procedure, the MME 403 may forward the updated equivalent PLMN* list to the eNB 402 through a separate signaling message.

Figure 5:
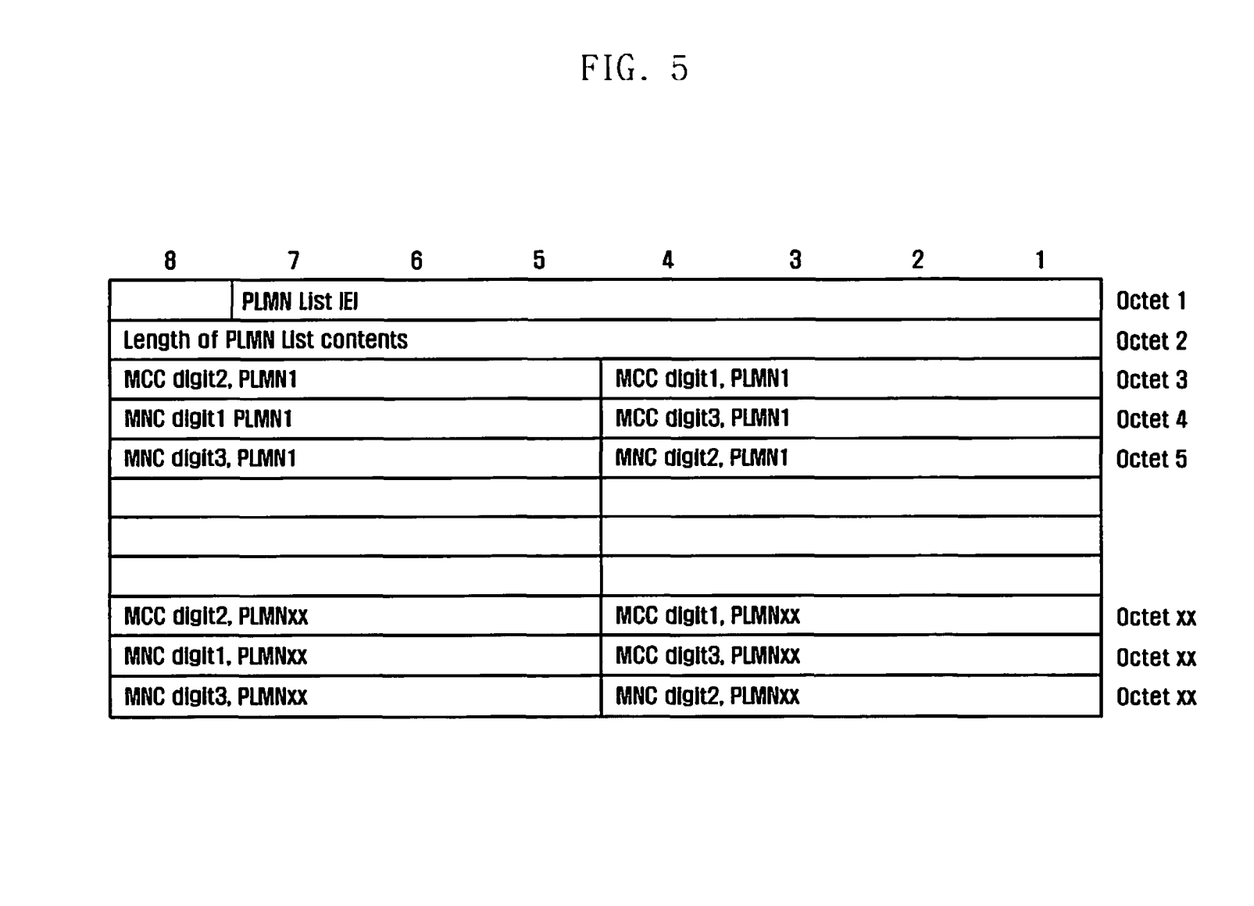
FIG. 5 illustrates a PLMN list supporting VoLTE according to a second embodiment of the present invention.

FIG. 5 illustrates a VoLTE-support PLMN list according to the second embodiment of the present invention.

The MME may deliver not only a conventional equivalent PLMN list but also a VoLTE-support PLMN list to the UE having a preference for VoLTE. The VoLTE-support PLMN list may be delivered as part of delivery of the equivalent PLMN list or be separately delivered through a Non-Access Stratum (NAS) procedure or a S1 Application Protocol (S1-AP) procedure. The NAS is a message transmission protocol between UE and MME, and the S1-AP is a message transmission protocol between eNB and MME. The VoLTE-support PLMN list includes only PLMNs supporting VoLTE.

Figure 6:
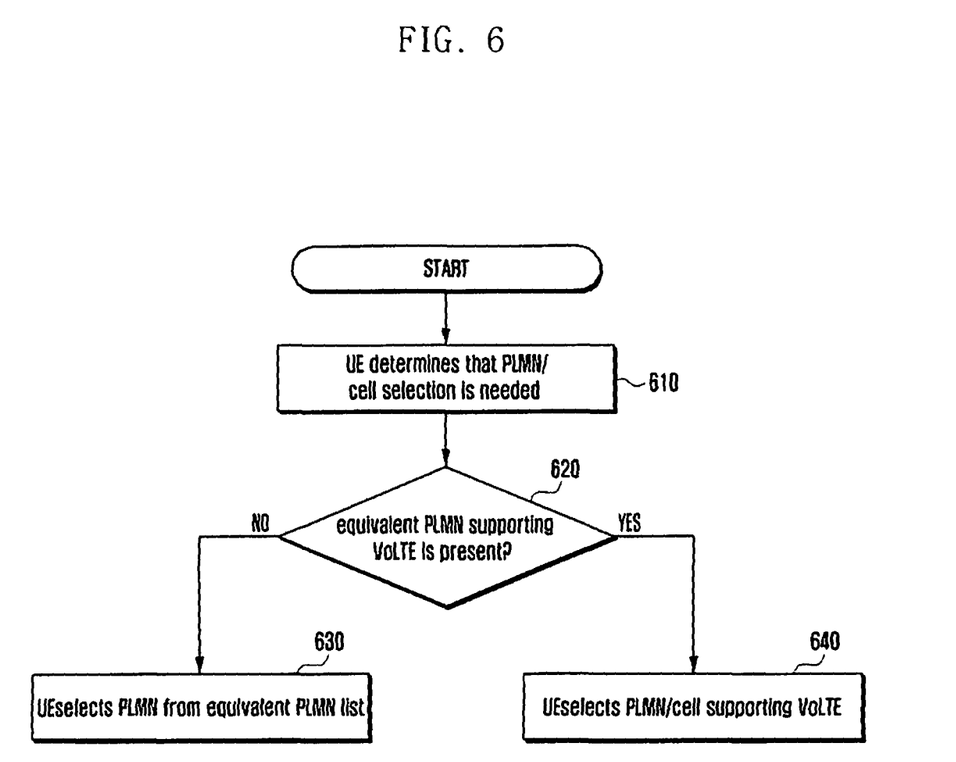
FIG. 6 is a flowchart of a procedure performed by the UE for PLMN/cell selection according to a third embodiment of the present invention.

FIG. 6 is a flowchart of a procedure performed by the UE for PLMN/cell selection according to the third embodiment of the present invention.

The UE stores an equivalent PLMN* list (described as the first embodiment) or VoLTE-support PLMN list (described as the second embodiment) delivered from the MME. Referring to FIG. 6, at step 610, the UE determines that PLMN and/or cell selection is necessary. At step 620, the UE determines whether an equivalent PLMN supporting VoLTE is present. Here, the equivalent PLMN* list (first embodiment) or VoLTE-support PLMN list (second embodiment) may be used for this determination. If an equivalent PLMN supporting VoLTE is present, the procedure proceeds to step 640 at which the UE performs PLMN and/or cell selection according to the equivalent PLMN supporting VoLTE. If an equivalent PLMN supporting VoLTE is not present, the procedure proceeds to step 630 at which the UE performs PLMN and/or cell selection according to a randomly selected equivalent PLMN.

When the UE maintains a VoLTE-support PLMN list, the UE may examine the VoLTE-support PLMN list first for PLMN and/or cell selection.

Figure 7:
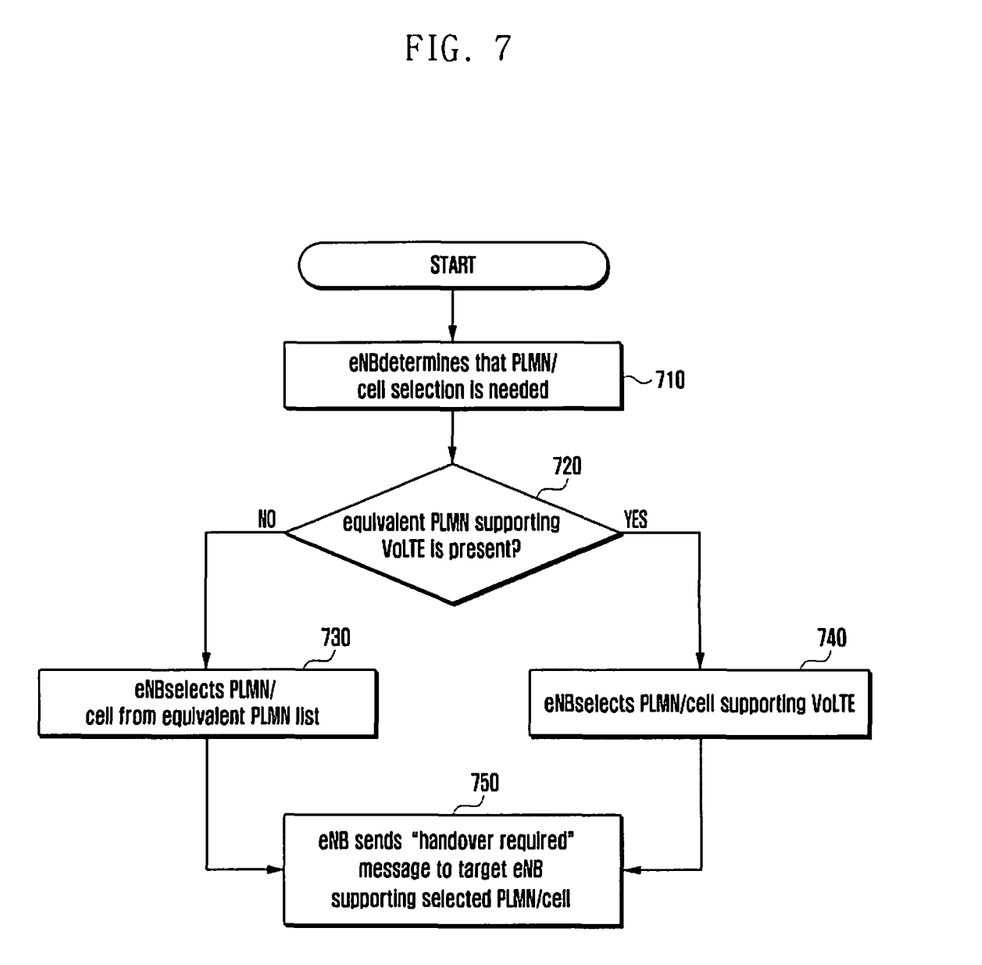
FIG. 7 is a flowchart of a procedure performed by the eNB for PLMN/cell selection according to a fourth embodiment of the present invention.

FIG. 7 is a flowchart of a procedure performed by the eNB for PLMN/cell selection according to the fourth embodiment of the present invention.

The eNB stores an equivalent PLMN* list (described as the first embodiment) or VoLTE-support PLMN list (described as the second embodiment) delivered from the MME. Referring to FIG. 7, at step 710, the source eNB determines that PLMN and/or cell selection is necessary. At step 720, the eNB determines whether an equivalent PLMN supporting VoLTE is present on the equivalent PLMN* list or VoLTE-support PLMN list. If an equivalent PLMN supporting VoLTE is present, the procedure proceeds to step 740 at which the eNB performs PLMN and/or cell selection according to the equivalent PLMN supporting VoLTE. If an equivalent PLMN supporting VoLTE is not present, the procedure proceeds to step 730 at which the eNB performs PLMN and/or cell selection according to a randomly selected equivalent PLMN.

PLMN/cell selection may involve selecting, by the source eNB, a cell belonging to the PLMN as the target cell. PLMN selection may involve selecting, by the source eNB, an eNB serving a cell belonging to the PLMN as the target eNB.

At step 750, the eNB sends a "handover required" message to the target eNB supporting the selected PLMN and/or cell.

Figure 8:
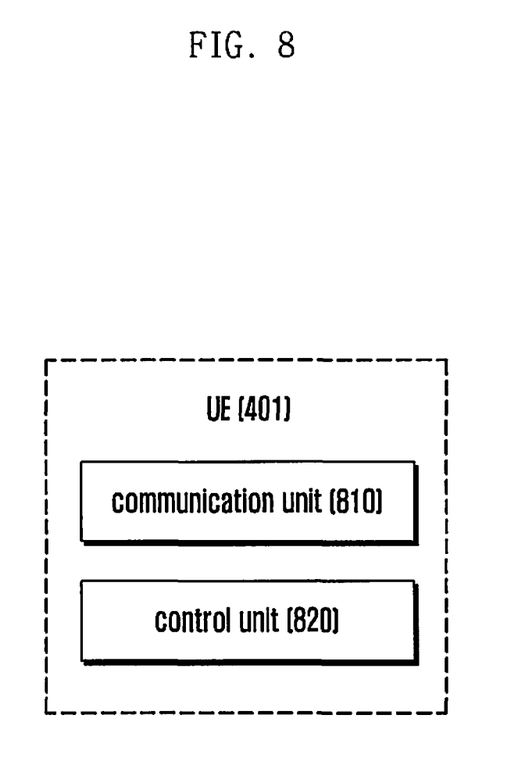
FIG. 8 is a block diagram of a UE 401 according to an embodiment of the present invention.

FIG. 8 is a block diagram of a UE 401 according to an embodiment of the present invention. Referring to FIG. 8, the UE 401 includes a communication unit 810 and a control unit 820. Components of the UE 401 not directly related to the embodiments of the present invention are omitted. The control unit 820 controls the UE 401 to perform PLMN selection according to one of the above embodiments. For example, the control unit 820 may perform decision/control operations necessary for the procedure described in FIG. 6. The communication unit 810 sends and receives signals needed to carry out one of the above embodiments.

Figure 9:
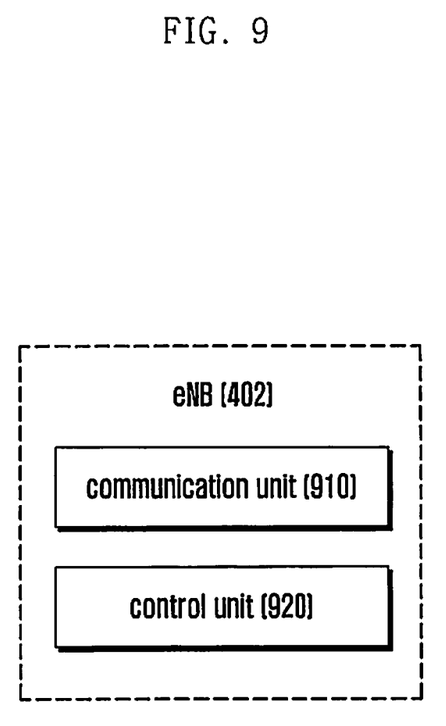
FIG. 9 is a block diagram of an eNB 402 (or base station) according to an embodiment of the present invention.

FIG. 9 is a block diagram of an eNB 402 (or base station) according to an embodiment of the present invention. Referring to FIG. 9, the eNB 402 includes a communication unit 910 and a control unit 920. Components of the eNB 402 not directly related to the embodiments of the present invention are omitted. The control unit 920 controls the eNB 402 to perform PLMN selection according to one of the above embodiments when the UE 401 performs handover. For example, the control unit 920 may perform decision/control operations necessary for the procedure described in FIG. 7. The communication unit 810 sends and receives signals needed to carry out one of the above embodiments.

Figure 10:
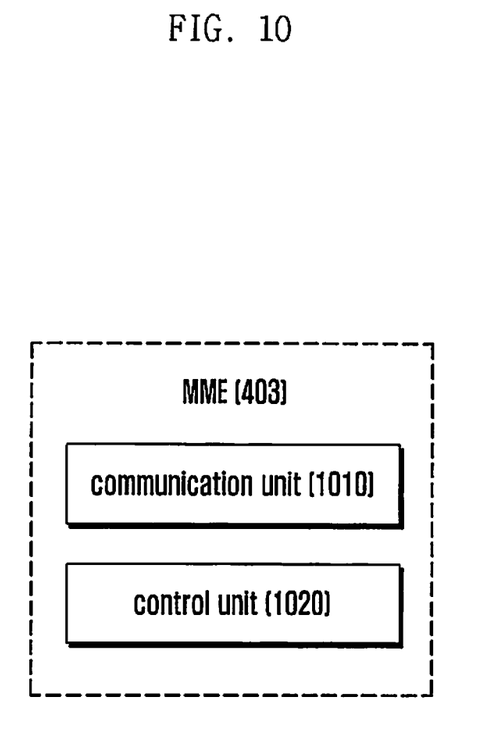
FIG. 10 is a block diagram of an MME 403 according to an embodiment of the present invention.

FIG. 10 is a block diagram of an MME 403 according to an embodiment of the present invention. Referring to FIG. 10, the MME 403 includes a communication unit 1010 and a control unit 1020. Components of the MME 403 not directly related to the embodiments of the present invention are omitted. The control unit 1020 controls the MME 403 to create an equivalent PLMN* list or VoLTE-support PLMN list according to one of the above embodiments when a request is received from the UE 401. For example, the control unit 1020 may perform decision/control operations necessary for the procedure described in FIG. 2. The communication unit 1010 sends and receives signals needed to carry out one of the above embodiments.

The above embodiments are described with a focus on VoLTE preference of a UE and VoLTE supportability of an eNB/cell/PLMN. The above description may also be applied to the case of a specific preference of a UE and corresponding supportability of an eNB/cell/PLMN. For example, when a UE prefers a second protocol to a first protocol for data connection, a scheme similar to that described in the above embodiments may be utilized so as to link the UE with an eNB/cell/PLMN supporting the second protocol.

The above embodiments can be implemented as a program executable on an electronic device such as a computer, and the program can be stored in a storage medium.

The invention claimed is:

1. A method for providing a Public Land Mobile Network (PLMN) list in a Mobility Management Entity (MME), the method comprising:
    receiving a request including information on user equipment (UE) preference for Voice over Long Term Evolution (VoLTE) from a UE;
    determining whether the UE prefers VoLTE according to the request;
    generating the PLMN list associated with a PLMN supporting the VoLTE based on the UE preference for VoLTE and VoLTE support of an evolved Node B (eNB); and
    transmitting, if the UE prefers the VoLTE and the eNB serving the UE supports the VoLTE, the PLMN list associated with the PLMN supporting the VoLTE.

2. The method of claim 1, wherein transmitting the PLMN list comprises transmitting a variant equivalent PLMN list or a VoLTE-support PLMN list if the UE prefers the VoLTE and the eNB serving the UE supports the VoLTE, and
    wherein the variant equivalent PLMN list includes, for each PLMN, information indicating whether the VoLTE is supported by the PLMN, and the VoLTE-support PLMN list includes only PLMNs supporting the VoLTE.

3. A method for selecting an equivalent Public Land Mobile Network (PLMN) in a user equipment (UE), the method comprising:
    transmitting a request including information on UE preference for Voice over Long Term Evolution (VoLTE) to a Mobility Management Entity (MME);
    receiving a PLMN list associated with a PLMN supporting the VoLTE; and
    selecting an equivalent PLMN supporting VoLTE based on the PLMN list,
    wherein the PLMN list is generated by the MME based on the UE preference for VoLTE and VoLTE support of an evolved Node B (eNB).

4. A method for selecting an equivalent Public Land Mobile Network (PLMN) in an evolved Node B (eNB), the method comprising:
    receiving a PLMN list associated with a PLMN supporting the VoLTE;
    selecting, if PLMN selection is needed for a UE having a preference for VoLTE, an equivalent PLMN supporting VoLTE based on the PLMN list; and
    sending a "handover required" message to a target eNB corresponding to the selected PLMN,
    wherein the PLMN list is generated by the MME based on the UE preference for VoLTE and VoLTE support of the eNB.

5. A Mobility Management Entity (MME) providing Public Land Mobile Network (PLMN) lists, comprising:
    a communication unit to receive a request including information on user equipment (UE) preference for Voice over Long Term Evolution (VoLTE) from a UE; and
    a control unit to determine whether the UE prefers VoLTE on the basis of the request, and generate a PLMN list associated with a PLMN supporting the VoLTE based on the UE preference for VoLTE and VoLTE support of an evolved Node B (eNB),
    wherein, if the UE prefers the VoLTE and the eNB serving the UE supports the VoLTE, the communication unit transmits the PLMN list associated with the PLMN supporting the VoLTE.

6. The MME of claim 5, wherein the communication unit transmits the PLMN list comprising a variant equivalent PLMN list or a VoLTE-support PLMN list if the UE prefers VoLTE and the eNB serving the UE supports the VoLTE, and
    wherein the variant equivalent PLMN list includes, for each PLMN, information indicating whether the VoLTE is supported by the PLMN, and the VoLTE-support PLMN list includes only PLMNs supporting the VoLTE.

7. A user equipment (UE) selecting an equivalent Public Land Mobile Network (PLMN), comprising:
    a communication unit to transmit a request including information on UE preference for Voice over Long Term Evolution (VoLTE) to a Mobility Management Entity (MME) and receive a PLMN list associated with a PLMN supporting the VoLTE; and a control unit to select an equivalent PLMN supporting VoLTE based on the PLMN list, wherein the PLMN list is generated by the MME based on the UE preference for VoLTE and VoLTE support of an evolved Node B (eNB).

8. An evolved Node B (eNB) selecting an equivalent PLMN, comprising:

a communication unit to receive a PLMN list associated with a PLMN supporting a Voice over Long Term Evolution (VoLTE); and a control unit to select, if PLMN selection is needed for a user equipment (UE) having a preference for VoLTE, an equivalent PLMN supporting VoLTE based on the PLMN list, wherein the communication unit sends a "handover required" message to a target eNB corresponding to the selected PLMN, and wherein the PLMN list is generated by the MME based on the UE preference for VoLTE and VoLTE support of the eNB.

* * * * *